US006968106B2

(12) United States Patent
Chastain et al.

(10) Patent No.: US 6,968,106 B2
(45) Date of Patent: Nov. 22, 2005

(54) AIR BLOWN FIBER (ABF) CABLE WITH LOW COMPOSITE COEFFICIENT OF THERMAL EXPANSION

(75) Inventors: Scott M. Chastain, Holly Springs, NC (US); Terri L. Dixon, Cary, NC (US); Glenn M. Gregrich, Stow, OH (US); Keith Quistorff, Cary, NC (US); Brett W. Schultz, Burton, OH (US)

(73) Assignee: Sumitomo Electric Lightwave Corp., Research Triangle Park, NC (US)

(*) Notice: Subject to any disclaimer, the term of this patent is extended or adjusted under 35 U.S.C. 154(b) by 9 days.

(21) Appl. No.: 11/053,361

(22) Filed: Feb. 8, 2005

(65) Prior Publication Data

US 2005/0147363 A1    Jul. 7, 2005

Related U.S. Application Data

(62) Division of application No. 09/928,304, filed on Aug. 13, 2001, now Pat. No. 6,853,781.

(51) Int. Cl.[7] ................................................ G02B 6/44
(52) U.S. Cl. ...................................... 385/112; 385/109
(58) Field of Search ....................... 385/112, 106, 109

(56) References Cited

U.S. PATENT DOCUMENTS

| 4,082,423 | A | * | 4/1978 | Glista et al. ................. 385/103 |
| 4,299,256 | A | * | 11/1981 | Bacehowski et al. ........ 138/137 |
| 4,681,896 | A | * | 7/1987 | Horrobin ..................... 514/552 |
| 4,792,965 | A | * | 12/1988 | Morgan ....................... 375/218 |
| 4,796,970 | A | * | 1/1989 | Reeve et al. ................. 385/109 |
| 4,892,442 | A | * | 1/1990 | Shoffner .................. 405/183.5 |
| 4,952,021 | A | * | 8/1990 | Aoki et al. ................... 385/109 |
| 5,358,011 | A | * | 10/1994 | Stockton et al. ............. 138/103 |
| 5,761,362 | A | * | 6/1998 | Yang et al. ................... 385/109 |
| 6,101,304 | A | * | 8/2000 | Quistorff et al. ............. 385/109 |
| 6,853,781 | B2 | * | 2/2005 | Chastain et al. ............. 385/112 |
| 2005/0089285 | A1 | * | 4/2005 | Bocanegra et al. .......... 385/114 |

* cited by examiner

*Primary Examiner*—Chandrika Prasad (57) ABSTRACT

An air blown fiber tube cable having improved thermal stability in contrast to conventional air blown fiber (ABF) tube cables and within which one or more air blown optical fiber units can be installed. The air blown fiber tube is formed from a cross-linked polyolefin (preferably cross-linked high density polyethylene) comprising at least one non-polymer filler material having a coefficient of thermal expansion less than the coefficient of thermal expansion of said tube.

27 Claims, 5 Drawing Sheets

7 Tube
FIG. 4C

19 Tube
FIG. 4D

2 Tube
FIG. 4A

3 Tube
FIG. 4B

AIR BLOWN FIBER (ABF) CABLE WITH LOW COMPOSITE COEFFICIENT OF THERMAL EXPANSION

RELATED APPLICATIONS

The present U.S. application is a divisional of U.S. patent application Ser. No. 09/928,304 filed Aug. 13, 2001 for "AIR BLOWN FIBER (ABF) CABLE WITH LOW COMPOSITE COEFFICIENT OF THERMAL EXPANSION," and which will issue on Feb. 8, 2005 as U.S. Pat. No. 6,853,781, the disclosure of which is incorporated herein by reference in its entirety.

TECHNICAL FIELD

The present invention relates to air blown fiber (ABF) tubes. More particularly, the invention relates to an air blown fiber (ABF) tube and tube cable jacket so as to provide both a low composite coefficient of thermal expansion and minimum post-extrusion shrinkage of the air blown fiber tube cable.

BACKGROUND ART

Air blown fiber (ABF) tube cables installed in harsh weather environments, such as aerial outside plant cables, are subjected to extreme temperature and environmental conditions. Low temperature shrinkage will ordinarily occur in the longitudinal axis direction of the tube and cable due to the relatively high coefficient of thermal expansion characteristic of the plastic used to manufacture conventional air blown fiber (ABF) tubes and cables. Significant shrinkage in the longitudinal axis direction of air blown fiber tubes may cause induced signal attenuation due to bending of the optical fibers housed in the tubes of the air blown fiber (ABF) tube cable. The optical fibers have a significantly lower coefficient of thermal expansion than the air blown fiber (ABF) tubes in which they reside. Due to their small size, optical fibers have a relatively low buckling resistance resulting in bending of the optical fibers within the air-blown fiber (ABF) tubes which may cause optical transmission signal loss.

Thus, it can be appreciated that the coefficient of thermal expansion and post-extrusion shrinkage can have detrimental effects on the performance of air blown fiber (ABF) tubes used for telecommunications. From a theoretical standpoint, the coefficient of thermal expansion and post-extrusion shrinkage of the tube should be as close to zero as possible. If the coefficient of thermal expansion and post-extrusion shrinkage of air blown fiber (ABF) tubes are not minimized through design and manufacturing, the tubes will shrink during use due to fluctuations in the temperature to which the tubes are exposed and the shrinkage can result in the aforementioned undesirable and sometimes catastrophic signal loss.

Applicants have developed a novel low shrink air blown fiber (ABF) tube that serves to overcome many of the referenced deficiencies of known air blown fiber (ABF) tubes and that provides reduced post extrusion shrinkage and coefficient of thermal expansion compared with previous tubes due to its novel construction and performance features.

DISCLOSURE OF THE INVENTION

In accordance with the present invention, applicants provide a novel air blown fiber optic tube cable with a low composite coefficient of thermal expansion. More specifically, the novel air blown fiber (ABF) optic tube cable assembly having improved thermal stability comprises an air blown fiber (ABF) tube within which one or more air blown optical fiber units can be installed, wherein the air blown fiber (ABF) tube is formed from a cross-linked polyolefin comprising a predetermined amount of an inorganic filler material such as chopped glass fiber, glass spheres, mica, talc, $CaCO_3$ or the like, and/or a predetermined amount of polymeric filler material such as polyaramid, liquid crystal polymers or other engineering resins. An additional ultraviolet (UV) radiation stabilizer filler may optionally be included, comprising a predetermined amount of carbon black or other suitable material which prevents deterioration of the polymer during exposure to ultraviolet (UV) radiation during the lifetime of the tube or cable. Another embodiment of the invention comprises a fiber optic cable assembly having improved thermal stability and comprising a plurality of air blown fiber (ABF) tubes within each of which one or more air blown optical fiber units can be installed wherein the air blown fiber (ABF) tubes are formed from a cross-linked polyolefin comprising a predetermined amount of inorganic filler material such as chopped glass fiber, glass spheres, mica, talc, $CaCO_3$ or the like, and/or a predetermined amount of polymeric filler material such as polyaramid, liquid crystal polymers or other engineering resins, and optionally comprising a predetermined amount of carbon black or other suitable ultraviolet (UV) radiation stabilizer. A jacket is positioned around the plurality of air blown fiber (ABF) tubes, and the jacket is formed from cross-linked polyolefin comprising a predetermined amount of inorganic filler material such as chopped glass fiber, glass spheres, mica, talc, $CaCO_3$ or the like, and/or a predetermined amount of polymeric filler material such as polyaramid, liquid crystal polymers or others engineering resins, and a predetermined amount of carbon black or other suitable ultraviolet (UV) radiation stabilizer.

It is therefore an object of the present invention to provide an improved air blown fiber (ABF) tube construction with optimized thermal stability and minimal post extrusion shrinkage.

It is another object of the present invention to provide an improved air blown fiber (ABF) tube construction wherein the cable construction has a coefficient of thermal expansion value of less than 150 $\mu$m/m° C. over the temperature range of 20° C. to 40° C.

It is another object of the present invention to provide an improved air blown fiber (ABF) tube construction which substantially obviates optical fiber buckling and bending and the resulting signal loss.

Some of the objects of the invention having been stated hereinabove, and which are addressed in whole or in part by the present invention, other objects will become evident as the description proceeds when taken in connection with the accompanying drawings as best described hereinbelow.

DETAILED DESCRIPTION OF THE INVENTION

Description of the Preferred Embodiments

Preferred embodiments of the improved thermal stability air blown fiber (ABF) tube and the air blown fiber (ABF) tube cable in accordance with the present invention are described below with reference to FIGS. 2–6 of the drawings.

Figure 1:
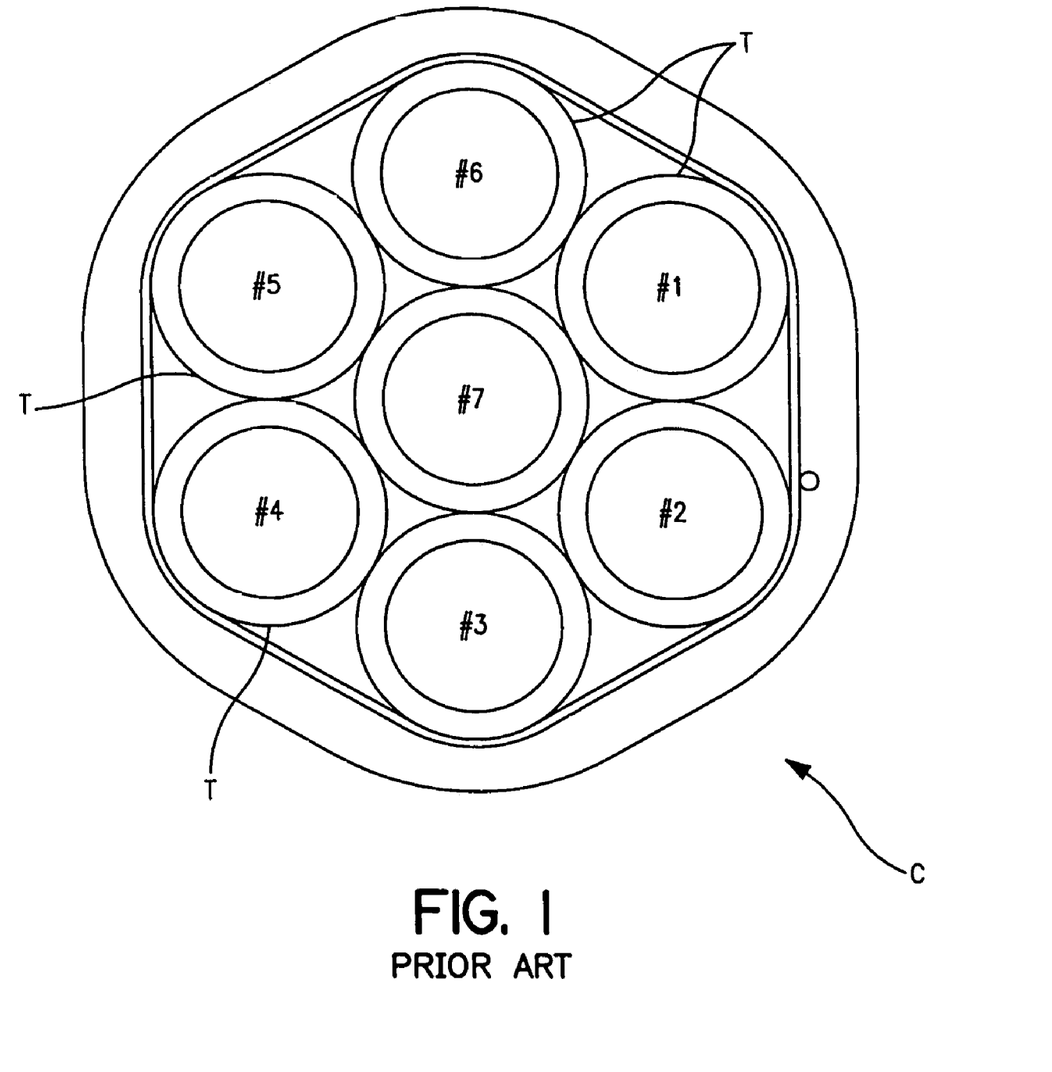
FIG. 1 is a cross section of a prior art multiple tube air blown fiber (ABF) tube cable.

Referring now to FIG. 1, prior art blown fiber (ABF) tubes T are shown that can be used alone or in an air blown fiber (ABF) tube cable C as depicted in FIG. 1. Air blown fiber (ABF) tube T as shown is capable of supporting installation of multiple air blown optical fiber units and providing for cabling system upgrade capability. Prior art air blown fiber (ABF) tube T and tube cable C can be formed in a wide variety of sizes and tube counts in accordance with customer demands. For example, air blown fiber (ABF) tube cable C may comprise multiple 8 mm air blown fiber tubes T formed from polyethylene and jacketed with polyethylene to form a tube cable with a finished outside diameter of 29 mm. The shortcomings of the prior art air blown fiber (ABF) tubes T and tube cables C with respect to low temperature shrinkage are described in detail in the preceding Related Art Section. Summarily, the prior art air blown fiber (ABF) tubes T and tube cables C shown in FIG. 1 utilize common polyethylene compounds and conventional dimensions and configurations. The subject invention described in detail below has similar dimensions and configurations as the prior art air blown fiber (ABF) tubes T and tube cable C shown in FIG. 1, but are formed from novel materials to form a composite structure as described in detail hereinafter.

Figure 2:
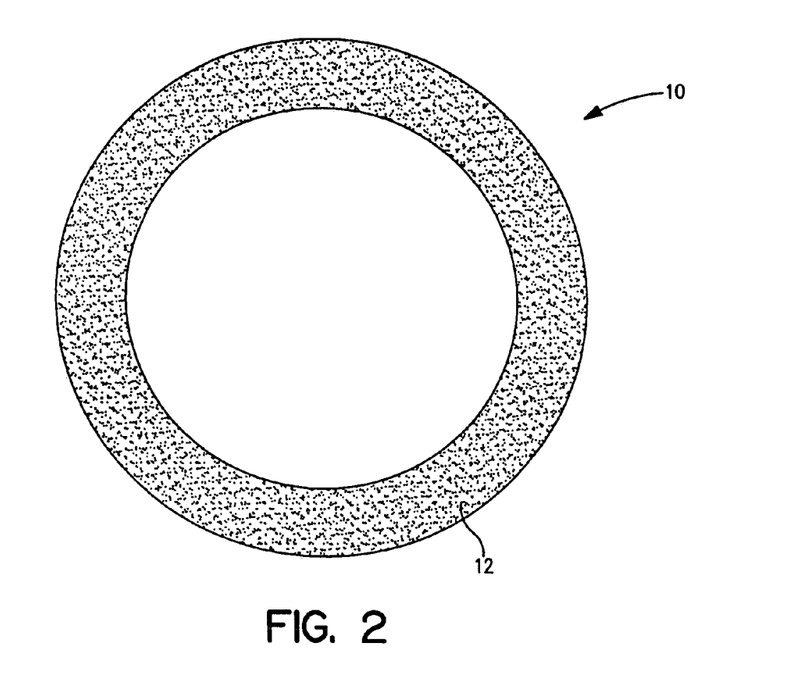
FIG. 2 is a cross section of an air blown fiber (ABF) tube according to an embodiment of the present invention.

FIG. 2 shows improved air blown fiber (ABF) tube 10 of the present invention, which reduces low temperature shrinkage and post-extrusion shrinkage inherent in conventional air blown fiber (ABF) tube cables such as C shown in FIG. 1 by over 50% at −40° C. Tube 10 is formed of a cross-linked polyolefin (preferably high density cross-linked polyethylene) incorporating an inorganic filler material such as chopped glass fiber, glass spheres, mica, talc, $CaCO_3$ or the like and optionally incorporating carbon black or other suitable ultraviolet (UV) stabilizer as needed for ultraviolet (UV) radiation protection. While an inorganic filler is preferred, it is contemplated that similar results may be achieved using polymeric fillers such as polyaramid, liquid crystal polymers, or engineered resin fillers either alone or in combination with the aforementioned inorganic fillers. Optimal cross-linking of the high density polyethylene forming tube 10 is in accordance with ASTM Standard D2765-95, Method A, and ranges between 40.0%–90.0% and most suitably between 65.0%–89.0%. Electron-beam, peroxide, Azo compounds, or vinyl silane may be used to initiate the cross-linking. Vinyl silane in a high temperature moisture bath is the preferred method. The optional addition of carbon black provides ultraviolet (UV) radiation resistance to tube 10 in applications where the tube is exposed to ultraviolet (UV) radiation. Preferably, the final chopped glass content of tube 10 is no greater than 5.0% by mass of tube 10. The glass fill is preferably chopped glass fibers or microspheres. At loadings higher than 5.0%, tube 10 is susceptible to fracture at cold temperatures when bent to its minimum radius as recommended by industry and manufacturer recommendations. Use of other inorganic or organic fillers may allow the filler content to increase above 5%, however the content should be minimized to allow optional flexibility at low temperatures while maintaining the desired level of shrinkage control. A suitable size for tube 10 is 6.00±0.10 millimeters (mm) inner diameter by 8.00±0.13 millimeters (mm) outer diameter, but tube 10 may be manufactured in either smaller or larger diameters as required to accommodate optical fiber counts and tube cable designs as a matter of design choice.

The addition of chopped glass filling to air blown fiber (ABF) tube 10 creates a rough surface texture which can reduce sealing efficiency of tube couplings (not shown thereto). Thus, a smooth outer skin layer 24 comprised solely of a polyolefin or cross-linked polyolefin to increase coupling ability may be provided as shown in the air blown fiber (ABF) tube 20 depicted in FIG. 3. Air blown fiber (ABF) tube 20 comprises a cross-linked polyolefin (preferably high density cross-linked polyethylene) having 5.0% or less by mass of chopped glass therein with smooth outer layer 24 applied thereover. Layer 24, preferably formed of cross-linked high density polyethylene, typically should be between 0.02 and 0.25 millimeters (mm) in thickness. A standard tube coupling (not shown) must be able to withstand in excess of 200 psi static pressure without leakage, and smooth outer layer 24 provides a desirable smooth sealing surface to engage with pneumatic tube couplings.

Figure 3:
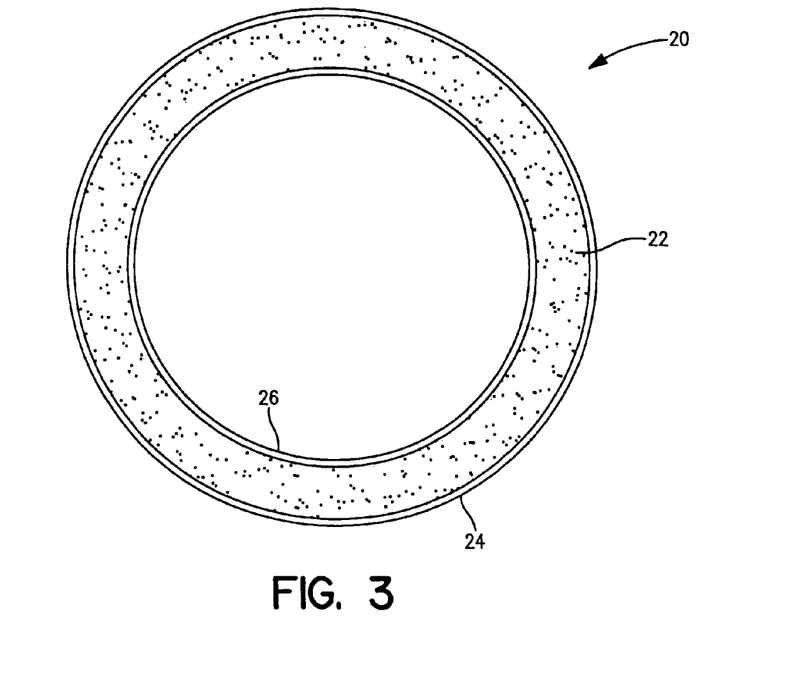
FIG. 3 is a cross section of an air blown fiber (ABF) tube according to a second embodiment of the present invention.
Figure 4A:
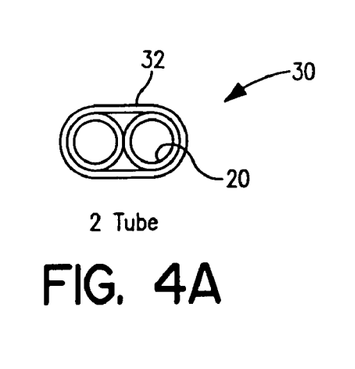
FIGS. 4A–4D are cross sections of air blown fiber (ABF) tube cables according to a third embodiment of the invention and containing two, three, seven and nineteen tube cables, respectively.
Figure 4B:
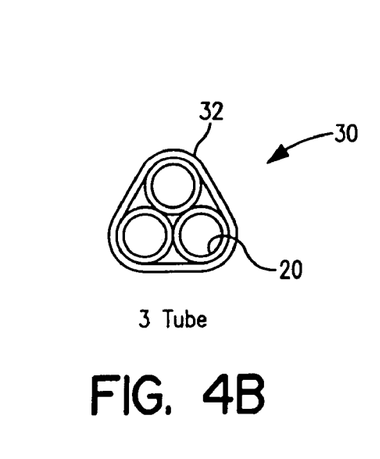
Figure 4C:
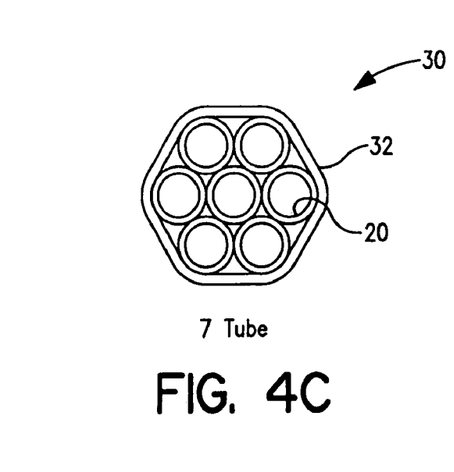
Figure 4D:
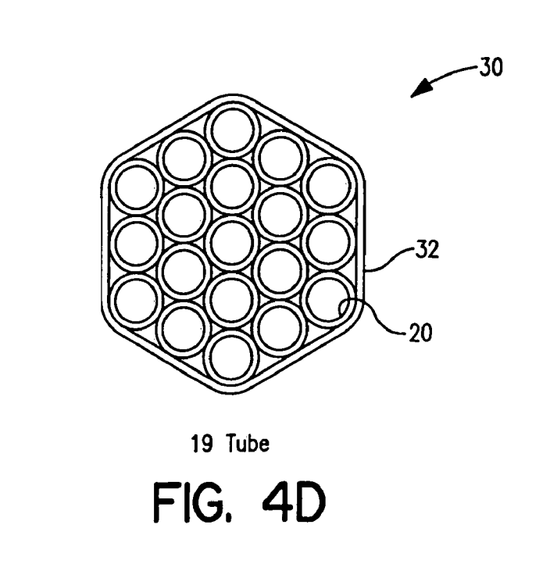

Also with reference to FIG. 3, a thin inner layer 26 has been applied within tube 20 to facilitate air blown optical fiber unit blowing performance of tube 20. Tube 20 may most suitably have an inner layer 26 comprising a polyolefin (preferably a cross-linked high density polyethylene) incorporating a maximum loading of 10% silicone lubricant for improved bundle blowing performance. Optionally, inner layer 26 may also include a chopped glass content of no greater than 5.0% by mass. Inner layer 26 is most suitably between 0.02 and 0.13 millimeters (mm) in thickness.

Referring now to FIGS. 4A–4D, another embodiment of the invention is shown wherein multiple air blown fiber (ABF) tubes are combined together and surrounded by a jacket 32 thereover for mechanical and environmental protection. The tubes within air blown fiber (ABF) tube cable 30 may be either tube 10 of FIG. 2 or tube 20 of FIG. 3 with jacket 32 extruded thereover. FIGS. 4A–4D depict air blown fiber (ABF) tube cable constructions comprising two, three, seven and nineteen tubes 20, respectively. The depictions are for purposes of illustration only, and are not intended to limit the scope of the present invention which is defined by the claims appended hereto. Similar to tubes 10 and 20, jacket 32 is comprised of cross-linked polyolefin (preferably cross-linked high density polyethylene) incorporating carbon black or other suitable ultraviolet (UV) radiation stabilizer. Most suitably the polyethylene also includes a chopped glass content, preferably 5.0% or less, by mass of jacket 32. Ideal cross-linking of jacket 32 is according to ASTM Standard D2765-95, Method A, and ranges between 40.0% and 90.0% and most suitably between 65.0% and 89.0%. Vinyl silane, E-beam, Azo compounds, or peroxide may be used to instigate the cross-linking of the high density polyethylene of jacket 32 in a high temperature moisture bath. The carbon black provides ultraviolet (UV) radiation stability to jacket 32. If more than 5.0% by mass of chopped glass content is used in jacket 32, jacket 32 may fracture at cold temperatures when bent to its minimum bend radius as recommended by industry and manufacturer recommendations. Typical thickness for jacket 32 should be about 1.50 millimeters (mm).

Figure 5:
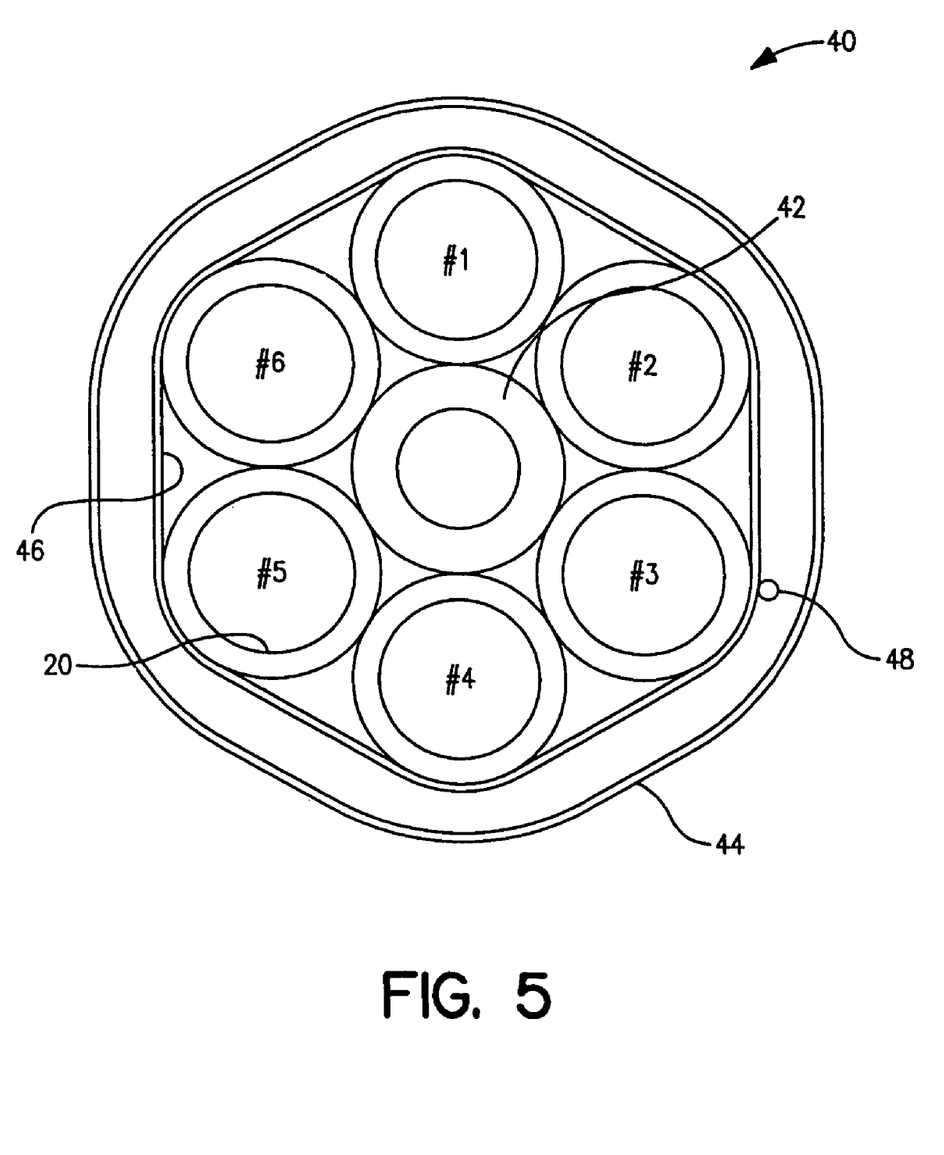
FIG. 5 is a cross section of an air blown fiber (ABF) tube cable according to another embodiment of the present invention that includes an optional longitudinally extending central strength member in addition to six air blown fiber (ABF) tubes.
Figure 6:
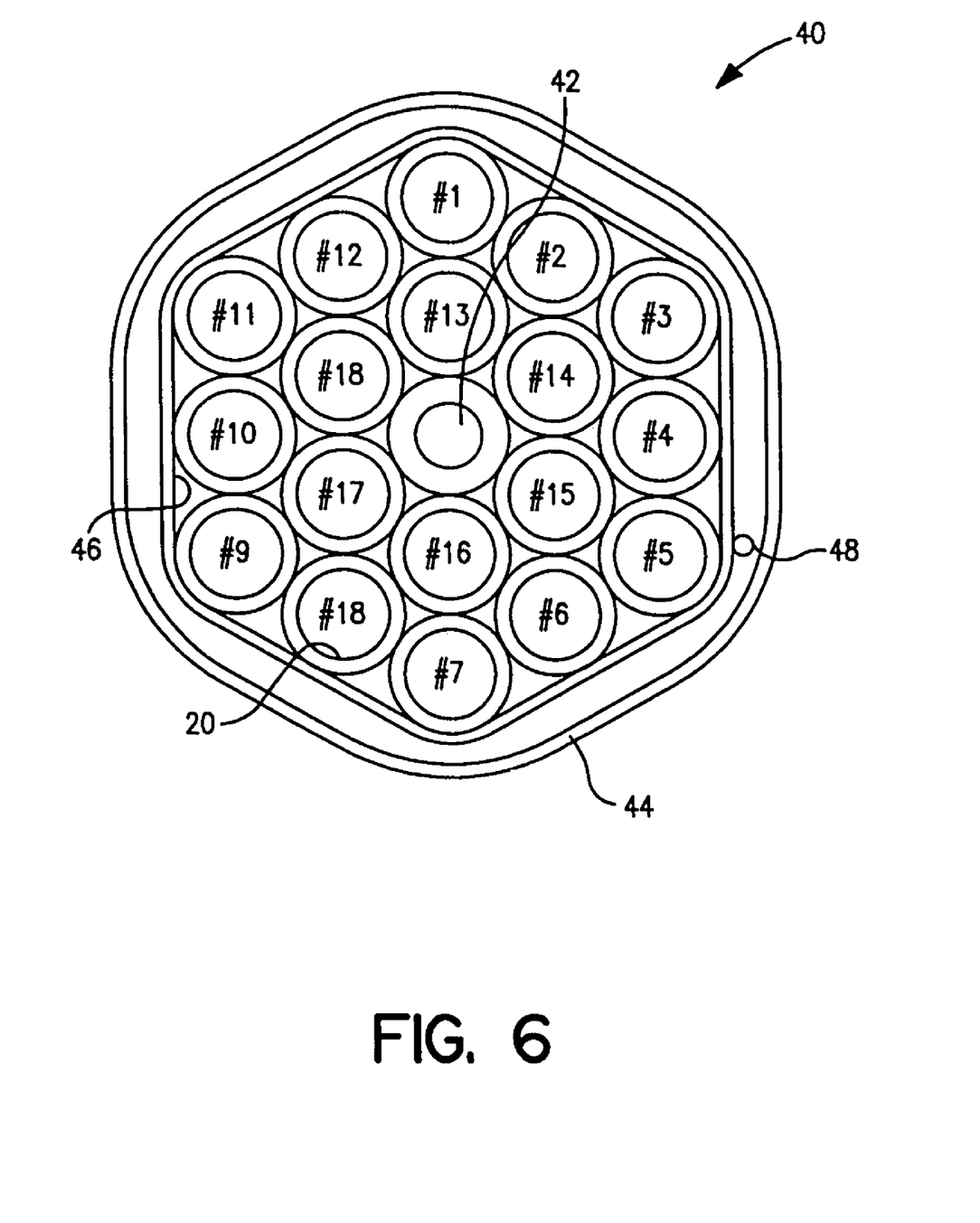
FIG. 6 is a cross section of an air blown fiber (ABF) tube cable according to another embodiment of the present invention that includes an optional longitudinally extending central strength member in addition to eighteen air blown fiber (ABF) tubes.

Referring now to FIGS. 5 and 6 of the drawings, it can be appreciated that dielectric or metallic strength elements 42 may be included in the air blown fiber (ABF) tube cable for additional tensile strength and buckling resistance. Preferably, strength members 42 are of rod design and not greater than 8.00 millimeters (mm) in diameter. Air blown fiber (ABF) tube cable 40 in FIGS. 5 and 6 also comprises outer jacket 44 and a plurality of tubes 20 (tubes 20 are shown only for purposes of illustration in the drawings and tubes 10 could also be provided in tube cable 40), a binder or tube wrap 46 such as water blocking tape may be applied along the length of tube cable 40 to bind tubes 20 and/or to protect the core from fresh or salt water, and a conventional rip cord 48 may also be utilized in the construction of air blown fiber (ABF) tube cable 40. Although FIGS. 5 and 6 depict six and eighteen tube cables, the number of tubes is a matter of design choice and the constructions shown in FIGS. 5 and 6 are not intended in any manner to limit the scope of the present invention, the invention being defined by the claims appended hereto.

Table 1 set forth hereinbelow illustrates the reduction in low temperature shrinkage and post-extrusion shrinkage provided by the tube of the present invention in contrast to currently available air blown fiber tubes. The information shown in Table 1 is formed as follows: Row 1 is a mono-wall construction tube of prior art high density polyethylene (HDPE) with 6.0 mm inside diameter and 8.0 mm outside diameter. Row 2 is a cross-linked high density polyethylene (HDPE) tube with 6.0 mm inside diameter and 8.0 mm outside diameter. Row 3 is the tube described by the present invention using cross-linked high density polyethylene (HDPE) and chopped glass fill with 6.0 mm inside diameter and 8.0 mm outside diameter. The measurements are taken as follows: Thermal Mechanical Analysis (TMA) was used to test low temperature shrinkage and post-extrusion shrinkage. Low temperature shrinkage was the average value of shrinkage seen at −40° C. Post-extrusion shrinkage was calculated as the percentage of shrinkage remaining after one complete temperature cycle between +75° C. and −55° C., starting at and then returning to room temperature (+20° C.) with a temperature ramp of 3° C./min.

TABLE 1

| Material | Low Temperature Shrinkage at −40 C. (%) | Post-Extrusion Shrinkage (%) |
| --- | --- | --- |
| HDPE | 1.88 | 0.77 |
| Cross-linked HDPE | 0.71 | 0.22 |
| Cross-linked HDPE with 3.75% chopped glass | 0.47 | 0.14 |

As can be appreciated with reference to the table, low temperature shrinkage and post-extrusion shrinkage is reduced by greater than 50% by the air blown fiber (ABF) tube construction of the present invention by utilizing cross-linked high density polyethylene for the cable polymer materials, and significantly more by using cross-linked high density polyethylene with chopped glass as taught herein in the complete cable structure.

METHOD OF MANUFACTURE

Presently, conventional air blown fiber (ABF) tubes exhibit a high coefficient of thermal expansion. Typically, this coefficient of thermal expansion causes tube contraction as high as 2.0% or more over the cable lifetime through the typical outside ambient temperature range. Thus air blown fiber (ABF) tubes are seldom used for these applications since loops have to be installed at each end of the run to accommodate the length change in the cable tubes as the temperature changes. For example, ten foot loops would have to be installed at each end of a one thousand foot run of conventional air blown fiber (ABF) tube cable to accommodate the high coefficient of thermal expansion values of the tube cable assembly.

The present invention provides for a mono wall tube 10 (FIG. 2) or multilayer wall tube 20 (FIG. 3) as well as corresponding tube cables 30 (FIGS. 4A–4D) and 40 (FIGS. 5 and 6) that will exhibit a coefficient of thermal expansion value of less than 150 $\mu$m/m° C. A preferred construction of the invention is multilayer tube 20 shown in FIG. 3 comprising an inner layer or liner 26 formed of a silicone lubricated cross-linked high density polyethylene. This material can be a custom compound or a dry blend of materials that are blended at the extruder by volumetric or gravanometric blending prior to being placed into an extruder. Optionally, inner layer 26 may also include a chopped glass content, preferably 5.0% or less by mass. Central layer 22 of tube 20 makes up the bulk of tube 20 and is comprised of cross-linked high density polyethylene and chopped glass strands and may include carbon black or other suitable ultraviolet (UV) radiation stabilizer. The material may be a custom compound or a dry blend of the polyethylene and a glass master batch (raw short glass fiber incorporated into the polyethylene). The addition of 5.0% or less by mass of the short glass strands serves to reinforce the polymer with more thermally stable glass material. Outer layer 24 of tube 20 is formed from cross-linked high density polyethylene, and outer layer 24 serves to allow the use of push-to-connect (PTC) fittings to make connections and splices in the tube and/or tube cables during routing and installation. Without outer layer 24, the surface of tube 20 could be too rough to allow the fittings to seal and maintain air pressure.

Mono wall tube 10 or multilayer tube 20 can be manufactured in a continuous operation utilizing a single extruder for mono wall tube 10 or a multilayer extrusion process for composite tube 20. In each construction the line speed and draw ratios will be optimized to limit the amount of post-extrusion stresses imparted to the tubing during processing since this parameter significantly affects the expansion and contraction values of finished tubes 10 and 20. Tubes 10 and 20 may incorporate carbon black or other suitable ultraviolet (UV) radiation stabilizer to provide ultraviolet (UV) stability and degradation protection to the product for long term reliability.

Referring now to FIGS. 4–6, after tube 10 and tube 20 are formed, various tubes can be made in configurations ranging from single tube applications to more complex two through nineteen tube cable constructions (see FIGS. 4A–4D). The resulting tube cables will be either of a planetary cabled, SZ cabled and/or parallel construction. The tube core may be wrapped with a water-blocking means. The preferred embodiment utilizes a flat, water-swellable tape, which may be applied spirally or longitudinally around the individual tubes 10 or 20 and/or around the cluster of tubes 10 or 20 forming the cable core. Over the cluster of tubes 10 or 20 an outer sheath or jacket 32 (see FIGS. 4A–4D) and 44 (see FIGS. 5 and 6) is applied to form tube cables 30 and 40, respectively, which meets the same design criteria for thermal expansion as do tube 10 and tube 20. Jacket 32 and 44 are formed from a cross-linked high density polyethylene and chopped glass compound similar or identical to that used in tube 10 and tube 20. Also, jacket 32 and 44 incorporate carbon black or other suitable UV stabilizer similar to that used in tube 10 and tube 20 to provide ultraviolet (UV) stability and degradation protection.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A fiber optic tube cable having improved thermal stability and comprising an air blown fiber (ABF) tube within which one or more air blown optical fiber units can be installed, said air blown fiber (ABF) tube formed from a cross-linked polyolefin having a first coefficient of thermal expansion and comprising at least one filler material having a second coefficient of thermal expansion less than said first coefficient of thermal expansion; whereby said tube has a coefficient of thermal expansion less than said first coefficient of thermal expansion of said cross-linked polyolefin; and said tube further comprising an inner layer of polyolefin or cross-linked polyolefin within said tube comprising a predetermined amount of silicone lubricant to facilitate installation of the one or more air blown optical fiber units.

2. The tube according to claim 1 wherein the inner layer of said tube further comprises a predetermined amount of chopped glass fiber.

3. A fiber optic tube cable having improved thermal stability and comprising an air blown fiber (ABF) tube within which one or more air blown optical fiber units can be installed, said air blown fiber (ABF) tube formed from a cross-linked polyolefin having a first coefficient of thermal expansion and comprising at least one filler material having a second coefficient of thermal expansion less than said first coefficient of thermal expansion; whereby said tube has a coefficient of thermal expansion less than said first coefficient of thermal expansion of said cross-linked polyolefin; and wherein a plurality of said air blown fiber (ABF) tubes are provided with a cross-linked high density polyethylene jacket thereover comprising a predetermined amount of carbon black or other suitable ultraviolet (UV) radiation stabilizer.

4. The tube cable according to claim 3 wherein said jacket further comprises a predetermined amount of chopped glass content that is not greater than 5.0% by mass of said jacket.

5. The tube cable according to claim 3 comprising one or more dielectric or metallic strength elements in addition to said plurality of air blown fiber (ABF) tubes.

6. A fiber optic tube cable assembly having improved thermal stability and comprising:
(a) a plurality of air blown fiber (ABF) tubes within each of which one or more air blown optical fiber units can be installed, said air blown fiber (ABF) tubes formed from a cross-linked polyolefin having a predetermined coefficient of thermal expansion and comprising at least one filler material having a coefficient of thermal expansion less than said predetermined coefficient of thermal expansion of said cross-linked polyolefin; and
(b) a jacket positioned around said plurality of air blown fiber (ABF) tubes, said jacket being formed from cross-linked polyolefin having a predetermined coefficient of thermal expansion and comprising at least one filler material having a coefficient of thermal expansion less than said predetermined coefficient of thermal expansion of said cross-linked polyolefin of said jacket;
whereby said tubes and said jacket have a coefficient of thermal expansion less than said predetermined coefficient of thermal expansion of said cross-linked polyolefin of said tubes and said jacket.

7. The tube cable assembly according to claim 6 wherein said at least one filler material of said tubes and said jacket comprises a predetermined amount of an inorganic filler material selected from, but not limited to, the group comprising chopped glass fiber, glass spheres, mica, talc, $CaCO_3$ and mixtures thereof.

8. The tube according to claim 6 wherein said at least one filler material comprises a predetermined amount of a polymeric filler material, and wherein said filler material may be fibrous or spherical but is not limited to these morphologies.

9. The tube cable assembly according to claim 6 wherein said cross-linked polyolefin comprises cross-linked high density polyethylene.

10. The tube cable assembly according to claim 9 wherein the cross-linked density range is between 40% and 90% according to ASTM standard D 2765-95, Method A.

11. The tube cable assembly according to claim 7 wherein the chopped glass fiber content of said tubes is not greater than 5.0% by mass of said tubes.

12. The tube cable assembly according to claim 11 wherein the chopped glass fiber consists of E-glass with a nominal diameter of 14 $\mu$m and a typical length less than 20 mm.

13. The tube cable assembly according to claim 6 comprising a smooth outer layer of cross-linked high density polyethylene around each of said tubes.

14. The tube cable assembly according to claim 6 comprising an inner layer of polyolefin or cross-linked polyolefin within each of said tubes comprising a predetermined amount of silicone lubricant to facilitate installation of the one or more air blown optical fiber sub-units.

15. The tube cable assembly according to claim 14 wherein the inner layers of said tubes further comprise a predetermined amount of chopped glass fiber.

16. The tube cable assembly according to claim 6 wherein said tubes and said jacket have a coefficient of thermal expansion value of less than 150 $\mu$m/m° C. over the temperature range of 20° C. to −40° C.

17. The tube cable assembly according to claim 7 wherein said jacket comprises a chopped glass content that is not greater than 5.0% by mass of said jacket.

18. The tube cable assembly according to claim 6 comprising one or more dielectric or metallic strength elements in addition to said plurality of air blown fiber (ABF) tubes.

19. A fiber optic tube cable assembly having improved thermal stability and comprising:
(a) a plurality of air blown fiber (ABF) tubes within each of which one or more air blown optical fiber units can be installed, said air blown fiber (ABF) tubes formed from a cross-linked high density polyethylene comprising a predetermined amount of carbon black and a predetermined amount of chopped glass fiber, and each of said air blown fiber (ABF) tubes including a smooth outer layer of cross-linked high density polyethylene thereover and an inner layer of cross-linked high density polyethylene comprising a predetermined amount of silicone lubricant therein; and (b) a jacket positioned around said plurality of air blown fiber (ABF) tubes, said jacket being formed from cross-linked high density polyethylene comprising a predetermined amount of carbon black and a predetermined amount of chopped glass fiber.

20. The tube cable assembly according to claim 19 wherein the cross-linked density range is between 40% and 90% according to ASTM Standard D 2765-95, Method A.

21. The tube cable assembly according to claim 19 wherein the chopped glass fiber content of said tubes is not greater than 5.0% by mass of said tubes.

22. The tube cable assembly according to claim 21 wherein the chopped glass fiber consists of E-glass with a nominal diameter of 14 $\mu$m and a typical length less than 20 mm.

23. The tube cable assembly according to claim 19 wherein the inner layers of said tubes further comprise a predetermined amount of chopped glass fiber.

24. The tube cable assembly according to claim 19 wherein said tubes and said jacket have a coefficient of thermal expansion value of less than 150 $\mu$m/m° C. over the temperature range of 20° C. to −40° C.

25. The tube cable assembly according to claim 19 wherein the predetermined chopped glass content of said jacket is not greater than 5.0% by mass of said jacket.

26. The tube cable assembly according to claim 19 comprising one or more dielectric or metallic strength elements in addition to said plurality of air blown fiber (ABF) tubes.

27. The tube cable assembly according to claim 19 comprising a water-blocking means applied around said air blown fiber (ABF) tubes.

* * * * *